(12) United States Patent
Sacchetti et al.

(10) Patent No.: US 9,966,783 B2
(45) Date of Patent: May 8, 2018

(54) PORTABLE ELECTRONIC DEVICE

(71) Applicant: Sensirion AG, Stafa (CH)

(72) Inventors: Andrea Sacchetti, Zurich (CH);
Andreas Tiefenauer, Zurich (CH);
Dominik Niederberger, Zurich (CH)

(73) Assignee: Sensirion AG, Stafa (CH)

( * ) Notice: Subject to any disclaimer, the term of this patent is extended or adjusted under 35 U.S.C. 154(b) by 136 days.

(21) Appl. No.: 14/410,929

(22) PCT Filed: Apr. 18, 2013

(86) PCT No.: PCT/CH2013/000065
§ 371 (c)(1),
(2) Date: Dec. 23, 2014

(87) PCT Pub. No.: WO2014/005235
PCT Pub. Date: Jan. 9, 2014

(65) Prior Publication Data
US 2015/0192477 A1 Jul. 9, 2015

(30) Foreign Application Priority Data

Jul. 2, 2012 (EP) .................................... 12004897

(51) Int. Cl.
*H02J 7/00* (2006.01)
*G01K 1/20* (2006.01)
(Continued)

(52) U.S. Cl.
CPC ............ *H02J 7/0072* (2013.01); *G01D 3/036* (2013.01); *G01K 1/20* (2013.01); *G01K 13/00* (2013.01);
(Continued)

(58) Field of Classification Search
CPC ........ G01K 1/20; G01K 13/00; G06F 1/1626; G06F 1/1684; G06F 1/206; H02J 7/0052; H02J 7/0072; G01D 3/036; Y02B 60/1275
(Continued)

(56) References Cited

U.S. PATENT DOCUMENTS 3,817,453 A  6/1974  Pinckaers
4,096,575 A  6/1978  Itoh
(Continued)

FOREIGN PATENT DOCUMENTS

CN        1458500      11/2003
CN        101290233    10/2008
(Continued)

OTHER PUBLICATIONS

Chinese Office Action in Chinese Patent Application No. 2013800295637.
(Continued)

*Primary Examiner* — Lisa Caputo
*Assistant Examiner* — Philip Cotey
(74) *Attorney, Agent, or Firm* — Cooper & Dunham LLP

(57) ABSTRACT

In a portable electronic device components (2) consuming electrical power during operation may generate heat. A temperature sensor (1) for sensing an ambient temperature ($T_S$) of the portable electronic device may as a consequence not supply the correct temperature value. It is suggested to provide a compensator (4) for determining a compensated ambient temperature ($T_A$) dependent on at least the sensed ambient temperature ($T_S$) and information ($P_i$) related to the electrical power consumed by at least one of the components (2).

25 Claims, 2 Drawing Sheets

(51) Int. Cl.
  *G06F 1/16* (2006.01)
  *G06F 1/20* (2006.01)
  *G01D 3/036* (2006.01)
  *G01K 13/00* (2006.01)

(52) U.S. Cl.
  CPC .......... *G06F 1/1626* (2013.01); *G06F 1/1684* (2013.01); *G06F 1/206* (2013.01); *H02J 7/0052* (2013.01); *Y02D 10/16* (2018.01)

(58) Field of Classification Search
  USPC ........................ 374/152, 141, 142
  See application file for complete search history.

(56) References Cited

U.S. PATENT DOCUMENTS

| | | | | |
|---|---|---|---|---|
| 4,694,239 | A * | 9/1987 | Marchio' | H02J 7/1453 |
| | | | | 322/34 |
| 4,789,822 | A * | 12/1988 | Ohmatoi | G01D 3/036 |
| | | | | 324/685 |
| 5,199,637 | A | 4/1993 | Adams | |
| 5,502,838 | A | 3/1996 | Kikinis | |
| 5,603,101 | A | 2/1997 | Choi | |
| 5,721,837 | A | 2/1998 | Kikinis et al. | |
| 6,122,678 | A * | 9/2000 | Eckel | G01K 1/045 |
| | | | | 340/567 |
| 6,203,191 | B1 | 3/2001 | Mongan | |
| 6,697,645 | B1 | 2/2004 | MacFarlane | |
| 6,728,552 | B2 | 4/2004 | Chatain | |
| 6,912,386 | B1 | 6/2005 | Himberg et al. | |
| 7,027,834 | B2 | 4/2006 | Soini et al. | |
| 7,280,301 | B1 | 10/2007 | Jackson et al. | |
| 7,364,353 | B2 | 4/2008 | Kolk | |
| 8,093,529 | B2 * | 1/2012 | Kofuji | G01K 13/00 |
| | | | | 118/724 |
| 8,106,646 | B2 | 1/2012 | Ariyama | |
| 8,182,139 | B2 * | 5/2012 | Fiennes | G01K 7/425 |
| | | | | 374/1 |
| 8,311,760 | B2 | 11/2012 | Hohe et al. | |
| 2003/0064749 | A1 | 4/2003 | Soini et al. | |
| 2005/0216102 | A1 | 9/2005 | Tanizawa | |
| 2006/0045164 | A1 * | 3/2006 | Schuh | G01K 15/00 |
| | | | | 374/1 |
| 2006/0165149 | A1 * | 7/2006 | Kolk | G01K 1/20 |
| | | | | 374/1 |
| 2006/0256529 | A1 * | 11/2006 | Liu | G06F 1/203 |
| | | | | 361/704 |
| 2008/0028778 | A1 * | 2/2008 | Millet | G06F 1/206 |
| | | | | 62/129 |
| 2008/0036447 | A1 * | 2/2008 | Slater | G01K 13/00 |
| | | | | 324/105 |
| 2008/0074407 | A1 * | 3/2008 | Zhou | G09G 3/20 |
| | | | | 345/204 |
| 2008/0143522 | A1 | 6/2008 | Sung | |
| 2008/0165116 | A1 | 7/2008 | Herz et al. | |
| 2008/0165826 | A1 * | 7/2008 | Cheng | G01K 7/01 |
| | | | | 374/178 |
| 2008/0218279 | A1 * | 9/2008 | Keating | H03B 5/04 |
| | | | | 331/70 |
| 2009/0072795 | A1 * | 3/2009 | Lovett | G01K 1/02 |
| | | | | 320/150 |
| 2009/0140059 | A1 | 6/2009 | Barton et al. | |
| 2009/0144014 | A1 | 6/2009 | Aljabari | |
| 2009/0310645 | A1 * | 12/2009 | Kofuji | G01K 13/00 |
| | | | | 374/12 |
| 2010/0117637 | A1 | 5/2010 | Ariyama | |
| 2010/0141329 | A1 * | 6/2010 | Kim | G01K 7/01 |
| | | | | 327/513 |
| 2010/0163713 | A1 | 7/2010 | Cheng et al. | |
| 2010/0217556 | A1 | 8/2010 | Hohe et al. | |
| 2010/0268475 | A1 | 10/2010 | Kusumoto | |
| 2010/0277128 | A1 * | 11/2010 | Tam | G06F 1/203 |
| | | | | 320/150 |
| 2010/0307916 | A1 | 12/2010 | Ramey et al. | |
| 2011/0119018 | A1 | 5/2011 | Skarp | |
| 2011/0127026 | A1 | 6/2011 | Schuch et al. | |
| 2011/0216806 | A1 | 9/2011 | Weng | |
| 2011/0280279 | A1 * | 11/2011 | Gregory | F01D 17/085 |
| | | | | 374/152 |
| 2011/0301777 | A1 * | 12/2011 | Cox | G06F 1/206 |
| | | | | 700/299 |
| 2011/0307208 | A1 | 12/2011 | Graf et al. | |
| 2012/0032555 | A1 * | 2/2012 | Koning | H03H 9/02448 |
| | | | | 310/315 |
| 2012/0224602 | A1 | 9/2012 | Crafts et al. | |
| 2013/0099008 | A1 * | 4/2013 | Aljabari | G05D 23/1932 |
| | | | | 236/1 C |
| 2013/0279537 | A1 * | 10/2013 | Tang | G01K 7/32 |
| | | | | 374/141 |
| 2014/0311209 | A1 | 10/2014 | Niederberger et al. | |
| 2014/0321503 | A1 | 10/2014 | Niederberger et al. | |
| 2014/0328367 | A1 | 11/2014 | Niederberger et al. | |
| 2014/0328368 | A1 | 11/2014 | Niederberger et al. | |
| 2014/0355649 | A1 | 12/2014 | Niederberger et al. | |
| 2015/0073741 | A1 | 3/2015 | Wuest et al. | |

FOREIGN PATENT DOCUMENTS

| | | |
|---|---|---|
| CN | 101738588 | 6/2010 |
| CN | 101802555 | 8/2010 |
| DE | 10150823 | 10/2000 |
| DE | 102011101355 | 11/2012 |
| EP | 0387025 | 9/1990 |
| EP | 1301014 | 4/2003 |
| EP | 1873506 | 1/2008 |
| EP | 1947432 | 7/2008 |
| EP | 2392898 | 12/2011 |
| EP | 2682715 | 1/2014 |
| EP | 2793450 | 10/2014 |
| EP | 2796841 | 10/2014 |
| EP | 2797000 | 10/2014 |
| EP | 2808650 | 12/2014 |
| EP | 2808651 | 12/2014 |
| EP | 2808652 | 12/2014 |
| JP | 6129870 | 5/1994 |
| JP | 2003344096 | 12/2003 |
| JP | 2004164418 | 6/2004 |
| JP | 2005274283 | 10/2005 |
| JP | 2006105870 | 4/2006 |
| JP | 2007059272 | 3/2007 |
| JP | 2010101741 | 5/2010 |
| JP | 2010534338 | 11/2010 |
| WO | 01/69341 | 9/2001 |
| WO | 2009014608 | 1/2009 |
| WO | 2010040090 | 4/2010 |
| WO | 2010139473 | 12/2010 |
| WO | 2011139456 | 11/2011 |
| WO | 2013045697 | 4/2013 |
| WO | 2013045897 | 4/2013 |
| WO | 2014005234 | 1/2014 |
| WO | 2014005235 | 1/2014 |
| WO | 2014067022 | 5/2014 |

OTHER PUBLICATIONS

Japanese first Office Action dated Mar. 29, 2016.
International Search Report No. PCT/CH2013/000065, dated Jun. 5, 2013, completed on May 28, 2013.
M. Afridi et al. "MEMS-based Embedded Sensor Virtual Components for System-on-a-Chip (SoC)" Elsevier, Solid State Electronics, vol. 48, 2004, pp. 1777-1781.
Sensirion, "Data Sheet SHTC1", Humidity and Temperature Sensor IC, Version 3, May 2014, pp. 1-14.
Sensirion, "Datasheet STS21" Temperature Sensor IC, Version 2, Dec. 2011, pp. 1-12.
Ip.com, Portable Electronic Device, An IP.com Prior Art Database Technical Disclosure, Jun. 24, 2013, XP013157887, 19 Pages.
Mayank Goel et al.. "GripSense: Using Built In Sensors to Detect Hand Posture and Pressue on Commodity Mobile Phones", UIST 12, Oct. 7-10, 2012, Cambridge, MA, USA, pp. 545-554.

(56) References Cited

OTHER PUBLICATIONS

European Search Report No. 120048797.0, dated Oct. 4, 2012, completed on Sep. 26, 2012.
Written Opinion and International Search Report No. PCT/CH2013/000065 dated Jun. 5, 2013, completed on May 28, 2013.

* cited by examiner

PORTABLE ELECTRONIC DEVICE

CROSS REFERENCES TO RELATED APPLICATIONS

This application is a § 371 national stage of PCT International Application No. PCT/CH2013/000065, filed Apr. 18, 2013, claiming priority of European Patent Application 12004897.0, filed Jul. 2, 2012, the contents of each of which are incorporated herein by reference in their entireties.

TECHNICAL FIELD

The present invention relates to a portable electronic device, to a method for operating a portable electronic device, and to a computer program element for operating a portable electronic device.

BACKGROUND ART

It is desired to conduct a precise measurement of the ambient temperature with a portable electronic device such as a mobile phone or a portable computing device, which portable electronic device typically comprises a processor and/or a display generating heat during operation.

DISCLOSURE OF THE INVENTION

This problem is solved by a portable electronic device according to the features of claim 1.

The portable electronic device comprises a temperature sensor for sensing an ambient temperature of the portable electronic device which temperature sensor typically provides a sufficient coupling to the environment of the portable electronic device, e.g. by being exposed to the ambient through openings in a housing of the device or other means. However, given that the portable electronic device, which may be a mobile phone or a portable electronic computing device in one embodiment, typically comprises components that consume electrical power and thereby release heat during operation, such as a processor and/or a display for example, the ambient temperature sensed by the temperature sensor may be impacted in view of heat migrating from such component to the temperature sensor. This may result in that the temperature sensed by the temperature sensor no longer reflects the real ambient temperature but reflects the real ambient temperature perturbed by the self-heating of the device. Hence, the present portable electronic device comprises a compensator for determining a compensated ambient temperature which preferably better reflects the real ambient temperature. This compensated ambient temperature represents an estimate of the real ambient temperature based on the sensed ambient temperature as supplied by the temperature sensor and by taking into account the heat generated at least at one heat releasing electronic component of the device via information being related to the electrical power consumed by this component.

As a result, the sensed ambient temperature preferably may be corrected by a temperature value owed to the heat transferred from the subject component to the temperature sensor. Preferably, all components of the device acting as major heat sources are involved in the compensation process, i.e. power consumption related information of all these components are included in compensating the sensed ambient temperature. A determination of major heat sources may be accomplished in relative terms by comparing the heat sources with each other and selecting the n heat sources that generated the most heat amongst the heat sources available. In a different approach, the n heat sources that have most impact on the temperature sensor are selected as major heat sources. In this approach the heat of a heat source propagated to the temperature sensor is the key criterion for selection, given that a heat source generating only little heat but being thermally well coupled to the temperature sensor may affect the sensing of the temperature most. For both approaches, a threshold may allow for selection, and in both approaches n may be at least one or more.

In a preferred embodiment, a display of the portable electronic device may be the at least one component that may contribute to the compensated ambient temperature, wherein power consumption related information of the display may be used for the compensation. Given that in todays smart phones or tablet computers displays are at large scale, a display may represent a major heat source during operation and as such affects the measurement of the ambient temperature by the temperature sensor.

In general, the power consumed in the relevant component may be measured and contributes to the determination of the compensated ambient temperature. However, other information representing or allowing for assessing the power consumed by the relevant component instead or additionally may contribute to the determination of the compensated ambient temperature. In the above embodiment of the display, an intensity of the display may constitute the power related information used for the reason that the brighter the display is operated the more power it consumes. A measure for the intensity of the display, however, may easily be available, e.g. in form of an intensity adjustment setting, while the exact power consumed by the display may be difficult to measure. Alternatively or in addition to the intensity the display is operated at, colors of the display and specifically a color distribution the display is operated at may be taken as a measure representing the power consumed by the display. For example, in case the display mostly shows black areas with only small areas of different colors, the power consumed by the display may be less than when the displayed is fully operated at bright colors. Bright colors may be taken as an indicator for a relatively high power consumption of the display. Hence, the color distribution may be taken as a measure of the power consumed by the display.

In another embodiment, an energy supply of the portable electronic device, e.g. a battery, may represent a component radiating heat at least during its recharge. Therefore, the energy supply can be considered as a power consumer in the portable electronic device. The power consumed by the power supply may be measured and used for compensation purposes. However, in another approach, information as to a charge level of the energy supply may be used instead given that the charge level as a measure of the power consumed may be available anyway as it is typically displayed to the user. In another approach, a derivative of the charge level may be used instead of the charge level, or in addition to.

In a preferred embodiment, a central processing unit (CPU) of the portable electronic device may be included in the at least one component that may contribute to the compensated ambient temperature, wherein information related to the power consumption of the central processing unit may be used for the compensation. In one embodiment, the power consumption of the central processing unit may be measured and used for compensation purposes. In another embodiment, a load related figure may represent the power consumption of the central processing unit. Such load related figure may be the present load or an average load over a period in time, for example. The load generally may be understood as an amount of computational work the central processing unit performs. The load may e.g. be represented by the number of running processes which is also denoted as CPU utilization, and/or by the number of processes queued in a CPU queue. CPU load data are often supplied by the operating system of the portable electronic device and as such are easily accessible. In another embodiment, the frequency the central processing unit is operated at—which is also denoted as clock rate—may also be taken into account given that the frequency has an impact on the heat generated by the central processing unit. In a preferred embodiment, the load and the frequency contributes to the information for compensating the sensed temperature. For example, the frequency may be multiplied by the load and the result may be input to the compensation model.

In another preferred embodiment, a radio frequency transceiver (RF) of the portable electronic device may be included in the at least one component that may contribute to the compensated ambient temperature, wherein information related to the power consumption of the transceiver may be used for the compensation. Especially in devices including a phone function and/or wireless data transmission such as mobile phones and specifically smart phones, a radio frequency transceiver is provided for sending and receiving audio signals and/or data to a base station of the underlying wireless network infrastructure. The radio frequency transceiver may be considered as a component the power consumption of which impacts the measurement of the ambient temperature. The power consumed by such transceiver may serve as the information for compensating a thermal impact of the transceiver. The transceiver may, for example, be one of a 2G, a 3G or a 4G transceiver, referring to the second, third or fourth generation of standards for mobile communication respectively, such as GSM, UMTS or LTE respectively. The transceiver may in other embodiments be one of a WLAN or a Bluetooth transceiver, or another near field communication (NFC) transceiver. The transceiver related power may be one or more of the transmitting and receiving power, and may be measured in one embodiment. In another embodiment, a signal strength of a signal received by the transceiver—such as a signal from the remote base station—may be taken as information related to the power consumed by the radio frequency transceiver, for example. The signal strength typically is a parameter that is provided anyway by the transceiver. This embodiment is based on the assumption that the higher the detected signal strength is, the less power is required for sending signals via the transceiver. And the smaller the detected signal strength is the more power is required for sending signals via the transceiver.

In another preferred embodiment, a beamer of the portable electronic device may be included in the at least one component that may contribute to the compensated ambient temperature, wherein information related to the power consumption of the beamer may be used for the compensation. Smartphones or tablet computers, in particular, may be equipped with a beamer which is understood as a light source for projecting content from the smartphone/tablet computer to a silver screen or other surface outside the portable electronic device. Such beamer may represent a major heat source during operation and as such affects the measurement of the ambient temperature by the temperature sensor.

In another preferred embodiment, a global positioning module or other sensor module of the portable electronic device may be included in the at least one component that may contribute to the compensated ambient temperature, wherein information related to the power consumption of the global positioning module or other sensor module respectively may be used for the compensation. Given that in todays smartphones or tablet computers GPS receivers or other global positioning modules are available for determining the device position based on signals received from satellites, such global positioning module may contribute as a heat source when being operated and as such may affect the measurement of the ambient temperature. Similar to the determination of the power consumption related information for the radio frequency transceiver, signal strength information provided by most of the global positioning modules may be taken as an indicator of the power consumption of the global positioning system under the assumption that the smaller the signal strength is, the more computational power is required to derive the position of the device in the global positioning module.

Other components that may be considered as heat sources impacting the measurement of the ambient temperature such that information related to the power consumption of these heat sources may be used for the compensation may include in embodiments one or more of: a camera, a speaker, a flash light, etc.

It is preferred, that in addition to the power related information of one or more components of the portable electronic device, the compensated ambient temperature may also be determined based on a thermal conductivity of a heat path between the one or more components and the temperature sensor. This measure may make the determination of the compensated ambient temperature even more precise since it takes into account the heat flux that effectively arrives at the temperature sensor rather than the bare heat that is generated at by the component.

In another embodiment, in addition to the power related information of one or more components, the compensated ambient temperature may be determined based on a thermal capacity of one or more of thermal capacitances in the portable electronic device. Such thermal capacitance may be represented by any element of the portable electronic device being capable of storing thermal energy. For example, a housing of the portable electronic device or parts thereof may be considered as a thermal capacitance. The thermal capacitance does not necessarily consume electrical power but may be heated by components which consume electrical power. The thermal capacitance may store the supplied thermal energy over some time. Such heat may be transferred to the temperature sensor via a thermal conducting path especially when the temperature at the temperature sensor is lower than the temperature of the thermal capacitance.

Preferably, it is only the major thermal capacitances that are taken into account for determining the compensated ambient temperature. Generally, it depends on the design of the portable electronic device how many components, thermal paths or thermal capacitances are available in the portable electronic device and which of these are selected for contributing to the compensation.

In another preferred embodiment, a sensed temperature of at least one other temperature sensor arranged in the device may be used for determining the compensated ambient temperature, especially when such temperature sensor is available in the device anyway. Such temperature sensor may include a temperature sensor that is arranged in the portable electronic device for measuring the temperature at a specific location, or the temperature of a specific component, such as, for example, a central processing unit of the device, or a battery.

Preferably, the portable electronic device may be one of a mobile phone, and especially a smart phone, a handheld computer, an electronic reader, a tablet computer, a game controller, a pointing device, a photo or a video camera, a computer peripheral.

According to another aspect of the present invention, a method is provided for operating a portable electronic device. An ambient temperature of the portable electronic device is sensed by means of a temperature sensor and a compensated ambient temperature is determined dependent on at least the sensed ambient temperature and on information related to electrical power consumed by at least one component of the portable electronic device.

According to a preferred embodiment, frequency contributions of the sensed ambient temperature with a frequency f>0 Hz are adjusted dependent on the sensed ambient temperature.

According to a further aspect of the present invention, a computer program element is provided for operating a portable electronic device, which computer program element, which preferably is stored on a computer storage medium, comprises computer program code means for receiving a signal representing an ambient temperature of the portable electronic device sensed by a temperature sensor of the portable electronic device, for receiving information related to electrical power consumed by at least one component of the portable electronic device, and for determining a compensated ambient temperature dependent on at least the sensed ambient temperature and the information related to the electrical power consumed by the at least one component of the portable electronic device, all when executed on a processing unit of the portable electronic device.

Generally, in any of the method, the portable electronic device and the computer program element, the temperature sensor may in an alternative not be provided and/or arranged for sensing the ambient temperature but may be provided and/or arranged for sensing a temperature of a component of the device or of a location within the device. Again, heat generated by (other) components may impact such measurement. Hence, it is again preferred that a compensator is provided for determining a compensated temperature dependent on at least the sensed temperature and information related to the electrical power consumed by at least one of the (other) components.

Other advantageous embodiments are listed in the dependent claims as well as in the description below. The described embodiments similarly pertain to the device, the method, and the computer program element. Synergetic effects may arise from different combinations of the embodiments although they might not be described in detail.

Further on it shall be noted that all embodiments of the present invention concerning a method might be carried out in the order of the steps as described. Nevertheless this has not to be the only essential order of steps but all different orders of the method steps shall be comprised in the scope of the claims and be disclosed by the method claims.

BRIEF DESCRIPTION OF THE DRAWINGS

The detailed description refers to embodiments of the present invention. Such description makes reference to the annexed drawings, wherein.

DETAILED DESCRIPTION

Figure 1:
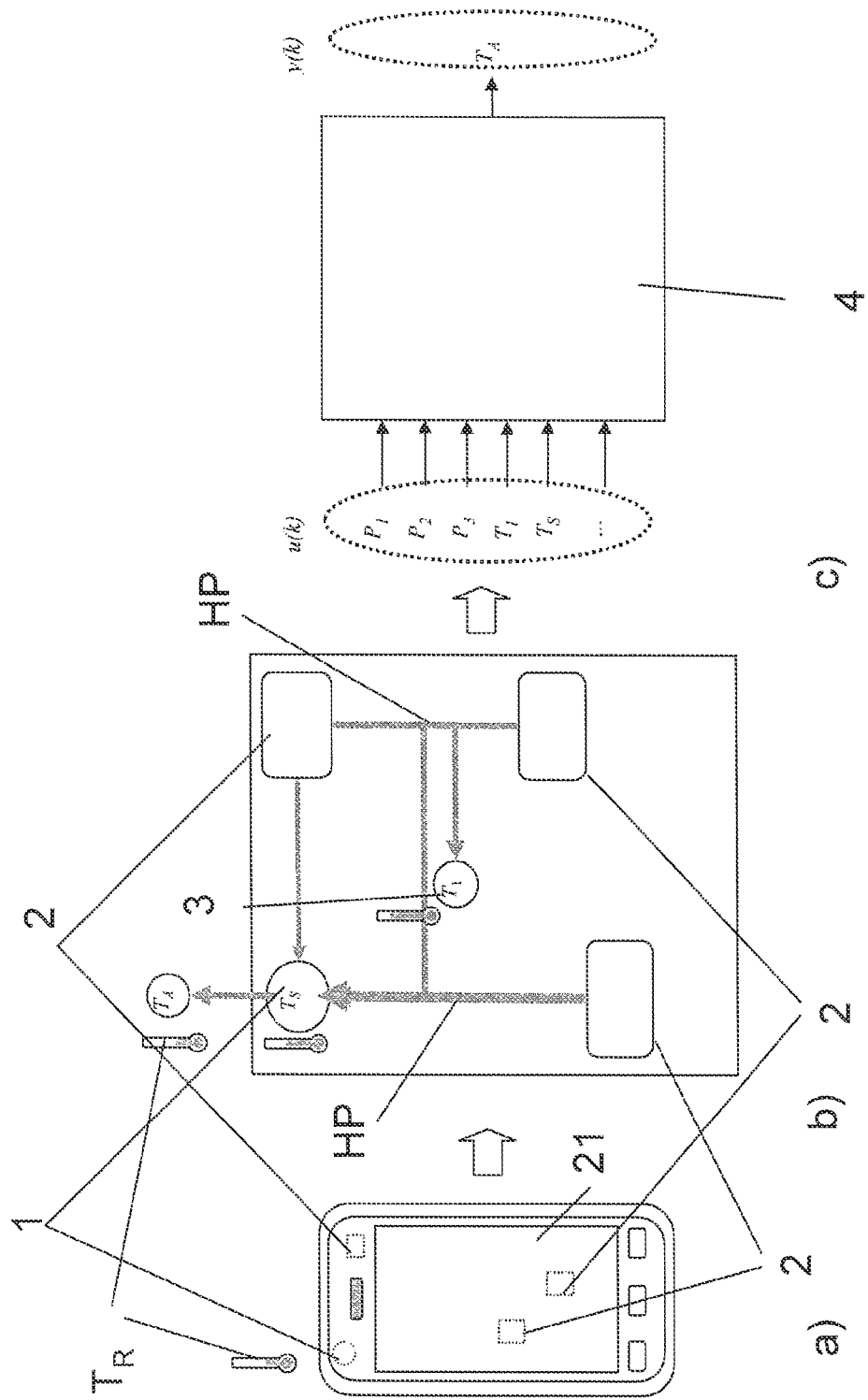
FIG. 1 illustrates a mobile phone according to an embodiment of the present invention in diagram a), an associated thermal block diagram in diagram b), and an associate compensator in diagram c)

FIG. 1a) shows a diagram illustrating a mobile phone according to an embodiment of the present invention. The mobile phone includes a temperature sensor 1 and several components 2 generating heat during operation of the mobile phone. The temperature sensor 1 provides a sensed ambient temperature $T_S$.

The temperature sensor 1 itself may not provide the real ambient temperature $T_R$ but a sensed ambient temperature $T_S$ deviating from the real ambient temperature $T_R$ because of a self-heating of the device that perturbs the internal temperature sensor 1. Another reason may be a slow dynamic that slows down a temperature response of the temperature sensor 1 when the real ambient temperature $T_R$ is changing.

In one embodiment, a method is described in how a signal of an integrated temperature sensor is compensated in order to more accurately determine the ambient temperature. This compensator preferably uses information of power consumption and/or temperature of electronic components in the device that act as heat sources during operation, and preferably calculates a heat propagation in time towards the temperature sensor for sensing the ambient temperature such that its influence can be compensated from the temperature sensor signal of the temperature sensor.

A display of the mobile phone is denoted by reference numeral 21. The display 21 may be one of the components that consume electrical energy and generate heat while doing so. Other heat generating components may be a central processing unit, a battery of the mobile phone, a radio frequency transceiver, a global positioning module, a beamer, etc. subject to availability in the device.

The real ambient temperature $T_R$ is desired to be estimated by the portable electronic device by determining a compensated ambient temperature $T_A$.

Switching to diagram 1b), a "thermal" block diagram of the mobile phone of diagram 1a) is shown. The heat generating components 2 are connected to the temperature sensor 1 and to each other by heat paths HP on which heat flux is propagated. In the present embodiment, another temperature sensor 3 is provided which other temperature sensor 3 may act as a sensor for sensing the temperature $T_1$ of a central processing unit of the device, or of any other component or location.

Preferably, a heat flux propagating to the temperature sensor 1 may be determined and be compensated for at the temperature sensor 1 by a compensator 4 as is shown in diagram 1c). The compensator 4 may be an entity, represented by hardware, software, or a combination of both, which receives the sensed ambient temperature $T_S$, the sensed temperature $T_1$, and information $P_1$, $P_2$, $P_3$ related to the power consumption of the three components 2 identified as most crucial in impacting the sensed ambient temperature $T_S$. The compensator 4 supplies at its output the compensated ambient temperature $T_A$.

In general, the compensator 4 may make use of a dynamic thermal model of the mobile device such as, for example, is shown in diagram 1b). The dynamic thermal model may mathematically be described by a differential equation system. The model may in one embodiment comprise one or more, and preferably the most relevant heat sources, and in another embodiment additionally one or more, and preferably the most relevant thermal conductivities, and in another embodiment additionally one or more, and preferably the most relevant heat capacities, as well as it comprises the temperature sensor that is well coupled to the ambient, and it may comprise one or more optional temperature sensors that may be available in the mobile device.

The compensated ambient temperature $T_A$ may then be estimated from these inputs by using the following Equation 1) as compensator 4:

$$x(k+1)=Ax(k)+Bu(k)$$

$$y(k)=Cx(k)+Bu(k) \quad \text{Collectively Equation 1)}$$

with u(k) denoting the inputs at time step k, y(k) denoting the output $T_A$, and x(k) denoting an internal state vector. A is an n-by-n matrix, B an n-by-m matrix, C an 1-by-n matrix and D an 1-by-m matrix, where n is the number of states that depends on the complexity of the model and m the number of inputs. Typical inputs may be, for example, an intensity of a display, a time derivative of a battery charge level, a central processing unit load, or other power management information. Additional temperature sensors at hot spots of the portable electronic device may improve the compensation results.

Hence, in one embodiment, the portable electronic device is modelled as a thermal system with heat sources, and optionally with heat capacities and/or thermal conductivities. From this model, a time-discrete compensator according to the state space description of Equation 1) is derived, that can easily be implemented on a microprocessor of the portable electronic device by using the following software code:

```
while not stopped
{
    u=Read_Input( );          // Read input
    y=C*x+D*u;                // Calculate output
    x=A*x+B*u;                // State Update
    T_A=y;                    // Ambient Temperature = y
}
```

The compensated ambient temperature $T_A$ may be displayed on the display 21.

Figure 2:
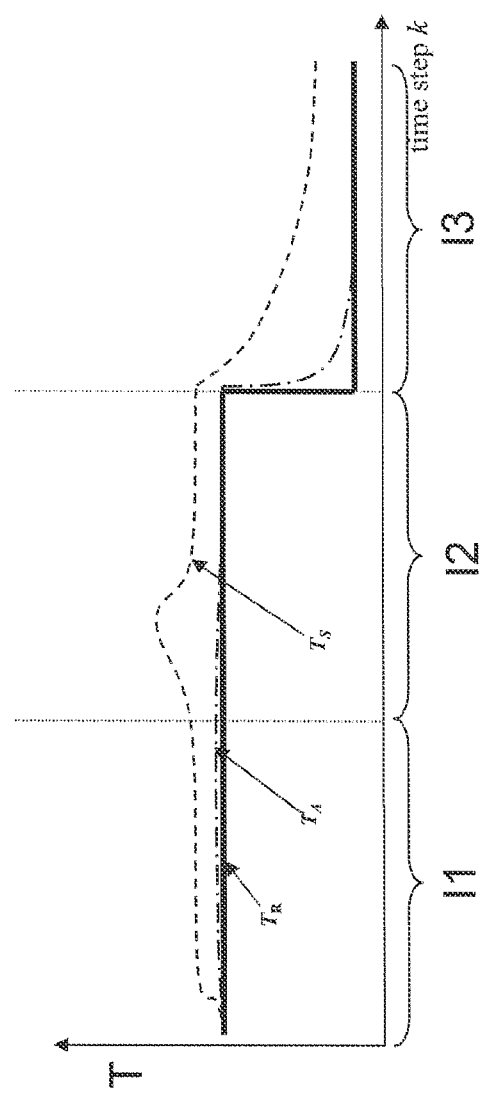
FIG. 2 shows a chart of different temperature signals over time illustrating the compensating effect according to embodiments of the present invention.

In a temperature T over time t chart according to FIG. 2, in which time t is represented by discrete time steps k*Δt, a sample real temperature characteristic $T_R$ in the ambient of a portable electronic device is shown by the straight line. The dashed line represents a corresponding ambient temperature $T_S$ as sensed by a temperature sensor of the mobile device. It becomes apparent from the chart in FIG. 2, that due to internal heating the temperature sensor detects an ambient temperature $T_S$ higher than the real ambient temperature $T_R$. Interval I1 may, for example, represent a time interval, in which the mobile device is operated at average load. However, in interval I2, it assumed that the mobile device at least temporarily is operated at high load, for example, by executing a video game requiring massive computational and display resources. This results in the sensed ambient temperature $T_S$ even more deviating from the real ambient temperature $T_R$: At the end of interval I2, the real ambient temperature $T_R$ drops, for example, due to the user of the mobile device entering a basement. The sensed ambient temperature $T_S$ follows the temperature drop in the real ambient temperature $T_R$ only slowly.

The dashed-dotted line, on the other hand, illustrates a compensated ambient temperature $T_A$ which is determined by using a compensator such as illustrated in diagram 1c), which is based on a thermal model of the portable electronic device. It can be seen, that from the beginning of the operation of the portable electronic device, a deviation of the compensated ambient temperature $T_A$ from the real ambient temperature $T_R$ is minimized, at least the compensated ambient temperature $T_A$ is lower than the sensed ambient temperature $T_S$. Even the high load operations of the mobile device releasing lots of heat do not impact the compensated ambient temperature $T_A$ very much.

In interval I3, the compensated ambient temperature $T_A$ much quicker aligns with the drop in the real ambient temperature $T_R$. This effect may be caused by implementing a temperature dependent compensation of dynamic contributions of the sensed ambient temperature $T_S$ in the compensator. A dynamic contribution is understood as any contribution in the spectral range with a frequency f>0 Hz. In case of a fast varying ambient temperature such as the step function at the end of interval I2, the compensator is enabled to accelerate the thermal dynamics of the mobile device such that the compensated ambient temperature $T_A$ responds faster to changes in the real ambient temperature $T_R$, and consequently in the sensed ambient temperature $T_S$. For such temperature dependent compensation of the dynamics of the sensed ambient temperature signal, it is referred to US Patent Publication US 2011/0307208.

Present embodiments of the invention benefit from a compensator for estimating a compensated ambient temperature in portable electronic devices by compensating disturbances caused by electronic components acting as internal heat sources during operation of the device. The compensated ambient temperature reflects the real ambient temperature with only small or no tolerances.

While there are shown and described presently preferred embodiments of the invention, it is to be distinctly understood that the invention is not limited thereto but may be otherwise variously embodied and practiced within the scope of the following claims.

The invention claimed is:

1. Portable electronic device, comprising:
   components consuming electrical power during operation,
   a temperature sensor for sensing an ambient temperature of the portable electronic device,
   a compensator for determining a compensated ambient temperature dependent on at least the sensed ambient temperature, and the electrical power consumed and measured and/or other information representing or allowing for assessing the power consumed by at least one of the components, said compensator making use of a dynamic thermal model of the mobile device, which dynamic thermal model is mathematically described by a differential equation system, and said electrical power consumed and measured and/or other information representing or allowing for assessing the power consumed by said at least one of the components being input to the compensator.

2. Portable electronic device according to claim 1,
   wherein the components include a display,
   wherein the compensator is adapted to determine the compensated ambient temperature dependent on the information representing or allowing for assessing the power consumed by the display.

3. Portable electronic device according to claim 2,
wherein the information representing or allowing for assessing the power consumed by the display includes a measure of one or more of an intensity and a color distribution the display is operated at.

4. Portable electronic device according to claim 2,
wherein the display is adapted to display the compensated ambient temperature.

5. Portable electronic device according to claim 1,
comprising a battery for supplying electrical power for operating the portable electronic device,
wherein the compensator is adapted to determine the compensated ambient temperature dependent on the information representing or allowing for assessing the power consumed by the battery during recharge.

6. Portable electronic device according to claim 5,
wherein the information representing or allowing for assessing the power consumed by the battery during recharge includes a measure of at least one of a charge level of the battery and a derivative of the charge level of the battery.

7. Portable electronic device according to claim 1,
wherein the components include a central processing unit,
wherein the compensator is adapted to determine the compensated ambient temperature dependent on the information representing or allowing for assessing the power consumed by the central processing unit.

8. Portable electronic device according to claim 7,
wherein the information representing or allowing for assessing the power consumed by the central processing unit includes one or more of a load of the central processing unit and a frequency of the central processing unit.

9. Portable electronic device according to claim 1,
wherein the components include a radio frequency transceiver,
wherein the compensator is adapted to determine the compensated ambient temperature dependent on the information representing or allowing for assessing the power consumed by the radio frequency transceiver.

10. Portable electronic device according to claim 9,
wherein the information representing or allowing for assessing the power consumed by the radio frequency transceiver includes a signal strength of a signal received by the radio frequency transceiver.

11. Portable electronic device according to claim 1,
wherein the components include a global positioning module for determining a position of the portable electronic device,
wherein the compensator is adapted to determine the compensated ambient temperature dependent on the information representing or allowing for assessing the power consumed by the global positioning module.

12. Portable electronic device according to claim 11,
wherein the information representing or allowing for assessing the power consumed by the global positioning module includes a signal strength of a position signal received by the global positioning module.

13. Portable electronic device according to claim 1,
wherein the compensator is adapted to determine the compensated ambient temperature dependent on a thermal conductivity of a heat path between the at least one of the components and the temperature sensor.

14. Portable electronic device according to claim 1,
comprising thermal capacitances,
wherein the compensator is adapted to determine the compensated ambient temperature dependent on a thermal capacity of at least one of the thermal capacitances.

15. Portable electronic device according to claim 1,
wherein the compensator comprises a model for determining a heat propagation as a function of time from the at least one of the components to the temperature sensor.

16. Portable electronic device according to claim 1,
comprising at least one other temperature sensor for sensing a temperature at a location within the portable electronic device,
wherein the compensator is adapted to determine the compensated ambient temperature dependent on the temperature sensed by the at least one other temperature sensor.

17. The device of claim 1, wherein the device is selected from the group consisting of a mobile phone, a handheld computer, an electronic reader, a tablet computer, a game controller, a pointing device, a photo camera, a video camera and a computer peripheral.

18. Method for operating a portable electronic device, comprising:
sensing an ambient temperature of the portable electronic device by means of a temperature sensor,
determining a compensated ambient temperature dependent on at least the sensed ambient temperature and dependent on the electrical power consumed and measured and/or other information representing or allowing for assessing the power consumed by at least one component of the portable electronic device, with a compensator making use of a dynamic thermal model of the mobile device, which dynamic thermal model is mathematically described by a differential equation system, and said electrical power consumed and measured and/or other information representing or allowing for assessing the power consumed by said at least one of the components being input to the compensator.

19. Method according to claim 18,
wherein the compensated ambient temperature is determined dependent on information representing or allowing for assessing the power consumed by a display of the portable electronic device.

20. Method according to claim 18,
wherein the compensated ambient temperature is determined dependent on information representing or allowing for assessing the power consumed by a central processing unit of the portable electronic device.

21. Method according to claim 18,
wherein the compensated ambient temperature is determined dependent on information representing or allowing for assessing the power consumed by a radio frequency transmitter of the portable electronic device.

22. Method according to claim 18,
wherein the compensated ambient temperature is determined dependent on information representing or allowing for assessing the power consumed by a global positioning module of the portable electronic device.

23. Method according to claim 18,
wherein the compensated ambient temperature represents the sensed ambient temperature adjusted by a temperature value representing an impact of heat released from the at least one of the components and propagated via a heat path to the temperature sensor on the sensed ambient temperature-.

24. Method according to claim 23,
wherein frequency contributions of the sensed ambient temperature with a frequency 10 Hz are adjusted dependent on the sensed ambient temperature.

25. Computer program element for operating a portable electronic device, comprising computer program code means for implementing the following steps when executed on a processor of a portable electronic device:
receiving a signal representing an ambient temperature of the portable electronic device sensed by a temperature sensor of the portable electronic device,
receiving information related to electrical power consumed by at least one component of the portable electronic device, and
determining a compensated ambient temperature dependent on at least the sensed ambient temperature and the electrical power consumed and measured and/or other information representing or allowing for assessing the power consumed by the at least one component, with a compensator making use of a dynamic thermal model of the mobile device, which dynamic thermal model is mathematically described by a differential equation system, and said electrical power consumed and measured and/or other information representing or allowing for assessing the power consumed by said at least one of the components being input to the compensator.

* * * * *